Nov. 11, 1952
M. J. FASANO ET AL
2,617,228
FISHING APPARATUS
Filed May 9, 1946
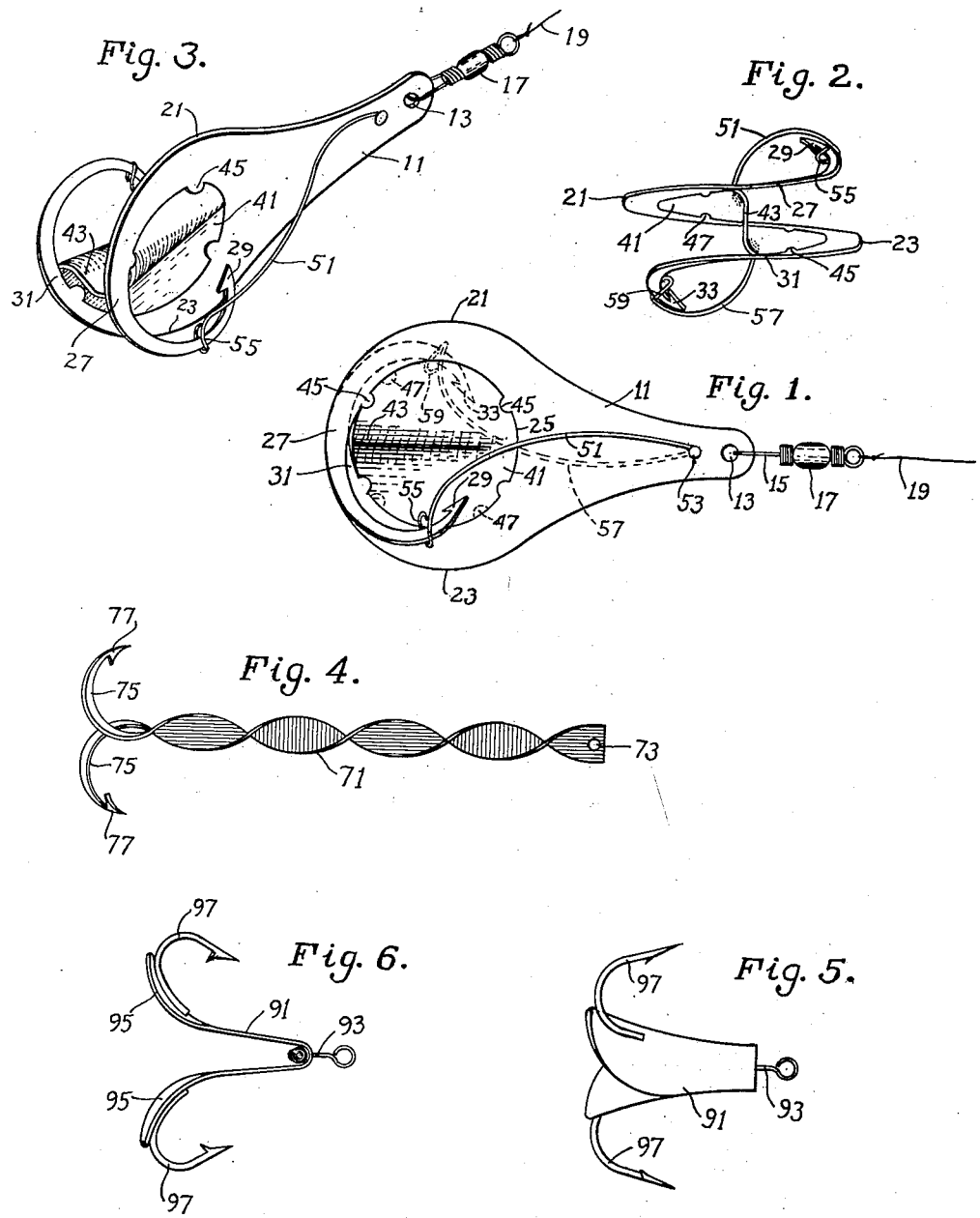
Michael J. Fasano and
Ernest F. Fasano
INVENTORS
BY Charles Shepard
Attorney.

Patented Nov. 11, 1952

2,617,228

UNITED STATES PATENT OFFICE 2,617,228

FISHING APPARATUS

Michael J. Fasano and Ernest F. Fasano, Rochester, N. Y.

Application May 9, 1946, Serial No. 668,503

3 Claims. (Cl. 43—42.51)

This invention relates to fishing apparatus, and more particularly to a combined lure and hook for use in attracting and catching fish.

An object of the invention is the provision of a generally improved and more satisfactory appliance of this type.

A further object is the provision of a fishing lure so constructed that it will rotate as it moves through the water, and having a hook so designed and constructed as to rotate with the lure and, by reason of its rotation, tend to embed itself more firmly in the fish.

Still another object is the provision of a rotating fishing lure in which the hook is pointed obliquely between the direction of longitudinal movement in the water and the direction of rotary movement in the water, so that both the longitudinal movement and the rotary movement tend to sink the hook into an object which it strikes.

A further object is the provision of an improved weed guard for a fishing hook, to prevent weeds or snags from fouling the hook.

A still further object is the provision of a resilient weed guard having one end encircling or embracing the shank of the hook near the barbed end thereof.

A still further object is the provision of a fishing lure of a rotary type, so designed and constructed as to simulate the appearance of a school of small fish following each other in tandem relation, thus rendering the device more enticing and attractive to the fish which it is desired to catch.

A still further object is the provision of fishing apparatus of more attractive appearance to the fish, and particularly of fishing apparatus so shaped that an attractively colored portion is visible from all lateral directions.

These and other desirable objects are accomplished by the construction disclosed as an illustrative embodiment of the invention in the following description and in the accompanying drawings forming a part hereof, in which:

Fig. 1 is a plan of a fishing appliance in accordance with a preferred embodiment of the invention;

Fig. 2 is an edgewise view of the same, looking at the rear end thereof;

Fig. 3 is a perspective view of the same;

Fig. 4 is an elevation of apparatus in accordance with a second embodiment of the invention;

Fig. 5 is an elevation of apparatus in accordance with a third embodiment of the invention; and Fig. 6 is a view of the apparatus shown in Fig. 5, seen from a different direction.

The same reference numerals throughout the several views indicate the same parts.

Fishing lures and similar fishing appliances are already known in great variety. The present invention provides a construction which is believed to be a substantial improvement over all of those previously known. One of the features of the present invention is the provision of a lure so shaped that it rotates as it is drawn longitudinally or axially through the water, and provided with one or more hooks so shaped and positioned that both the longitudinal movement and the rotary movement tend to drive the hook into and embed it in any object with which it comes into contact, such as a fish.

Referring first to the embodiment of the invention shown in Figs. 1, 2, and 3, there is provided in this embodiment a piece of sheet material 11, preferably of metal, having one end relatively small and provided with an eye 13 which may be connected at 15 to a swivel 17 attached to a fishing line 19. From this smaller or forward end, the plate 11 widens in a rearward direction, and is twisted or warped in such a way that, in a rearward direction from the small front end toward the large rear end, one lateral edge is progressively displaced in one direction from the original plane of the material and the opposite lateral edge is correspondingly progressively displaced in the opposite direction from the same plane of the original material, which may be the plane of the small forward end of the finished article. For example, the edge 21 may be displaced upwardly from the plane of the small forward end, and the edge 23 may be displaced downwardly from such plane, as seen in Figs. 1 and 2. To enable the metal to be displaced more readily in opposite directions at its edges, without requiring too much deformation along the center, and also for another purpose mentioned hereafter, a large opening 25 is preferably formed near the center, and is conveniently of approximately circular shape.

The fish hooks may be formed as separate pieces soldered or otherwise secured to the plate 11, but preferably are formed integrally as parts of the metal plate. Beyond the widest part of the plate, a narrow strip of the metal from the side 21 curves inwardly and upwardly as at 27 and terminates in a sharply pointed and barbed end 29 which is directed obliquely upwardly and inwardly in a direction toward the longitudinal axis of the appliance, as best shown in Figs. 1 and 2. From the opposite lateral edge 23 of the device, another narrow strip of metal 31, similar to the strip 27, is bent inwardly and downwardly and terminates in a sharp barbed hook 33 substantially duplicating the hook 29, but on the opposite side of the general plane of the device. The hooks 29 and 33 both extend obliquely forwardly and in the direction of rotation of the appliance as it is drawn through the water, and they may be visualized as being somewhat like the sharp pointed end of a corkscrew. Like a corkscrew, the hooks can be embedded in an object either by a forward longitudinal motion, or by a rotary motion, or by a combination of both motions. As this device is drawn through the water, in trolling or other fishing operations, the point of the hook moves forwardly and also rotates at the same time, so that the direction of travel of the hook is approximately the direction in which the extreme pointed end thereof lies, and thus any object getting in the way of the hook is readily and effectively impaled thereon. The sheet material forming the shank of each hook is twisted in such a way as to react with the water in a direction to assist the rotation of the body.

From an examination of Fig. 1 of the drawings it would appear at first glance that the upper hook 27, 29 is formed from the same area of the original metal sheet as the lower hook 31, 33, which would be an impossibility in practical manufacturing operations unless the thickness of the metal were split. However, in actual practice one of the hooks is formed from a portion of the metal plate lying just outside the other hook, and in the forming operation the outer hook is bent inwardly to reduce the radius of the curve thereof, and the inner hook is bent outwardly to increase the radius of the curve (when viewed in plane as in Fig. 1) so that in the finished article the two hooks appear at first glance to be formed from the same identical area of the metal plate.

To render the device more attractive to fish, the central opening 25 is substantially closed by a warped disc 41 preferably formed of molded plastic material, and of a bright color contrasting with the color of the metal plate 11. For example, the metal plate may have a polished metal appearance, and the plastic disc 41 may be of a blood red color, so that as a fish looks at it he will get the general impression of blood coming from a wounded fish, and will attack just as he would attack a wounded adversary fish. The edge of the disk 41, throughout most of its perimeter, is substantially in the shape of a helix, fitting snugly around the edge of the opening 25 in the metal plate. Diametrically down the center of the disk, however, along the longitudinal axis of the device, there is a curved step or offset 43 of progressively increasing size or depth from the front edge to the rear edge of the disk, as indicated in the drawing, so as to connect the portion of the disk which lies in the plane of the hook member 27 with the portion thereof which lies in the plane of the other hook member 31. This offset or step 43 is especially advantageous in that it provides a colored area readily visible to the fish from a lateral direction when the device is in edgewise relation to the line of view of the fish. In other words, as the lure turns when being dragged through the water, some part of the red disk is visible at all times during the cycle of rotation. When the device is flatwise to an adjacent fish, the fish sees substantially the full outline of the colored disk 41, approximately as shown in Fig. 1, and when the device is turned at a right angle to the plane of Fig. 1, the adjacent fish sees the step or offset 43 of the colored disk. Not only does the fish see some part of the colored area during the entire cycle of rotation, but moreover the apparent size of the colored area keeps varying as the device rotates, increasing and diminishing in apparent size in a manner which attracts the attention of an adjacent fish and which tends to give the impression of fresh gobs of blood dripping from a wounded adversary and then being dissipated in the water.

The disk is held in place in the opening 25 of the metal plate by any suitable means, such as ears on the disk overlapping opposite sides of the metal plate, or preferably ears 45 and 47 on the metal plate overlapping opposite faces of the disk.

Each hook is preferably provided with a weed guard, each weed guard preferably being of novel and improved construction, formed of a piece of resilient spring wire 51 having one end fixed to one face of the metal plate 11 near the forward end thereof, by soldering or by a rivet 53 or other suitable fastening means. From the connection 53, the wire 51 sweeps upwardly to an elevation a little above the extreme end of the hook 29 (when viewed endwise as in Fig. 2) and then downwardly, terminating in a loop 55 which loosely encircles the shank of the hook with considerable play, a little behind the barb at the end of the hook. The forward end of the wire 51 is rigidly attached to the metal plate 11, but the rear end is supported loosely or movably from the hook, because of the size of the loop 55.

As the appliance is drawn through the water past weeds, twigs, or other small obstructions, the wire 51 will act as a guard tending to keep weeds or other obstructions away from the point of the hook. However, when a fish takes the bait and attempts to swallow the entire device, the jaws of the fish easily flex the wire 51, deflecting it downwardly toward the metal plate and thus fully exposing the sharp point of the hook, which then becomes embedded in the mouth of the fish.

A similar weed guard, in all respects like the one just described, is placed on the opposite face of the metal plate 11, for cooperation with the other hook. This second weed guard has its spring wire shank indicated at 57 and the loop at 59.

This improved weed guard may, of course, be used with other forms of hooks than the particular forms shown in Figs. 1–3.

Referring now to Fig. 4 of the drawings, there is illustrated another form of fishing lure embodying some of the principles of the present invention, including the principle of rotation conjointly with longitudinal motion, and the shaping of the hooks in such manner that both the rotary movement and the longitudinal movement tend to embed the hook in an object with which it contacts.

In this form of the invention shown in Fig. 4, the main body of the lure is made of a metal strip 71 which is twisted spirally through several convolutions, as shown. An eye 73 at the forward end of the twisted strip is connected to a swivel and a fish line, just as in Fig. 1. Preferably one face of the strip is of one color and the opposite face is of a contrasting color. For example, one face may be of a blood red color and the other face may be of uncolored polished metal, such as nickel plating, chromium plating, or copper. When two contrasting colors are used on opposite faces of the twisted strip, it is apparent that when the strip is viewed from the side as in Fig. 4, each alternate convolution will appear to be of one color and the intermediate convolutions will appear to be of the other color. Thus the strip as a whole will tend to give to an adjacent fish the visual impression of a school of minnows following each other in tandem formation, since each convolution itself is somewhat the general shape of a minow or other small fish, when viewed from the side as in Fig. 4, if the right proportions are used. To secure this result, the helix formed by each edge of the twisted strip should have a pitch not less than twice and preferably about five times its diameter, and the strip should have a length not less than two complete turns of the helix, so there will be not less than four of the pointed elliptical areas which give the general impression of the shape of minnows.

At the rear end, the strip is split in two or bifurcated and the two portions thereof are curled around into the shanks 75 of two fish hooks, each terminating in a sharp pointed barbed end 77. The twist of the strip 71 will cause this strip to rotate as it is drawn through the water, and the hooks 75, 77 are shaped in a manner similar to the hooks shown in Figs. 1–3, so that the ends of these hooks 75, 77 are somewhat like the sharp end of a corkscrew and will point in the direction of movement of the hook as it rotates and moves longitudinally. Hence, in this form of the invention, as in the form shown in Figs. 1–3, both the rotary motion and the longitudinal motion of the hooks will tend to embed the hooks in an object lying in the path of the hooks. Weed guards may be used with these hooks, of the same construction shown in Figs. 1–3, or may be omitted, as preferred.

Referring now to Figs. 5 and 6 of the drawings, there is shown a third embodiment of the present invention, in which a spinner 91 is formed of a strip of metal doubled upon itself to a generally U-shaped configuration as indicated in Fig. 6, a swivel shank 93 being passed loosely through a central hole at the apex of the device. The two legs of the strip 91 are flared outwardly and simultaneously twisted as indicated at 95 in such manner that the device will rotate as it is drawn through the water. Fish hooks 97 are soldered or otherwise firmly fixed to the wings 95 of the device, these hooks, as before, having pointed ends extending obliquely forwardly and laterally in the direction of rotation of the device, so that as it turns, the rotary motion will tend to drive the point of the hook into any object in the way, as well as the longitudinal motion doing the same.

This form of the invention illustrates also the fact that the hooks, instead of being made integrally with the sheet metal body, may be separate hook members soldered or otherwise secured to the sheet metal body. The same weed guards previously described may be associated with these hooks 97, or may be omitted if desired.

It is seen from the foregoing disclosure that constructions are provided which admirably fulfill the above-mentioned objects of the invention. It is to be understood that the foregoing disclosure is given by way of illustrative example only, rather than by way of limitation, and that without departing from the invention, and that the constructions may be varied within the scope of the appended claims. For example, a body of wood or of molded plastic material may be so shaped as to rotate as it is drawn through the water, and may be provided with a hook pointed obliquely in the direction of rotation, in accordance with this invention.

What is claimed is:

1. A fishing appliance comprising a member to be drawn through the water, said member having inclined surfaces formed to produce rotation of the member as it is drawn longitudinally through the water, a hook mounted rigidly in fixed position relative to said member substantially at the rear end thereof and rotatable therewith, said hook having a sharp end pointed approximately in the direction in which said rear end of the member moves as said member rotates and travels longitudinally, so that both the rotary and the longitudinal movement will tend to drive said pointed end into an object lying in its path of travel, said member comprising a piece of sheet material having an opening of substantial size therein, the edge of the sheet material around said opening being formed approximately in the shape of a helix, and a disk of sheet material of contrasting color mounted in said opening.

2. A fishing appliance comprising an elongated main body formed of a single integral piece of sheet material twisted to react against water through which said body is drawn longitudinally to cause said body to rotate continuously about its longitudinal axis as it is drawn through the water the margin of the rear portion of said body being split to form two integral shank portions starting from opposite side edges of said body, each shank portion extending first rearwardly and then curving obliquely forwardly and terminating in a sharp pointed end, said body being of a width increasing from a relatively narrow portion at its front end to a substantially wider portion near its rear end and being provided with an opening of substantial size in said wider portion, and a warped sheet member of contrasting color inserted in said opening and twisted to react against the water to assist in the rotation of the body in the water.

3. A fishing appliance adapted to be drawn through the water longitudinally comprising a piece of sheet material of substantial length and increasing in width from a relatively narrow front end to a substantially wider rear end, the central portion of said material being cut away near said rear end so as to leave two marginal arms of opposite, generally helical curvature at opposite sides of the body, each of said arms extending progressively farther away from the plane of the forward end of said body, each arm terminating in a pointed end constituting a fish-engaging hook extending obliquely forwardly and laterally with the tips of the two hooks pointing in substantially opposite directions.

MICHAEL J. FASANO.
ERNEST F. FASANO.

REFERENCES CITED

The following references are of record in the file of this patent:

UNITED STATES PATENTS

| Number | Name | Date |
| --- | --- | --- |
| D. 148,254 | Rooke | Dec. 30, 1947 |
| 379,080 | Rice | Mar. 6, 1888 |
| 524,494 | Thayer | Aug. 14, 1894 |
| 647,076 | Carpenter | Apr. 10, 1900 |
| 749,852 | Dunn | Jan. 19, 1904 |
| 804,206 | Bruton | Nov. 14, 1905 |
| 836,038 | Hipp | Nov. 13, 1906 |
| 1,036,380 | Tileston | Aug. 20, 1912 |
| 1,362,562 | Doane | Dec. 14, 1920 |
| 2,213,701 | Hazelwood | Sept. 3, 1940 |
| 2,236,023 | Turner | Mar. 25, 1941 |
| 2,345,197 | Hirsch | Mar. 28, 1944 |
| 2,437,803 | Bell | Mar. 16, 1948 |